(12) United States Patent
Mansour

(10) Patent No.: US 9,335,408 B2
(45) Date of Patent: May 10, 2016

(54) METHOD AND SYSTEM FOR THROUGH-THE-WALL IMAGING USING SPARSE INVERSION FOR BLIND MULTI-PATH ELIMINATION

(71) Applicant: Mitsubishi Electric Research Laboratories, Inc., Cambridge, MA (US)

(72) Inventor: Hassan Mansour, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 416 days.

(21) Appl. No.: 13/947,426

(22) Filed: Jul. 22, 2013

(65) Prior Publication Data

US 2015/0022390 A1    Jan. 22, 2015

(51) Int. Cl.
*G01S 13/88* (2006.01)
*G01S 3/74* (2006.01)
*G01S 7/292* (2006.01)
*G01S 13/89* (2006.01)

(52) U.S. Cl.
CPC ............... *G01S 13/888* (2013.01); *G01S 3/74* (2013.01); *G01S 7/292* (2013.01); *G01S 13/89* (2013.01)

(58) Field of Classification Search
CPC ......... G01S 13/888; G01S 13/89; G01S 3/74; G01S 7/292

USPC ............................................................. 342/22
See application file for complete search history.

(56) References Cited

U.S. PATENT DOCUMENTS

| | | | |
|---|---|---|---|
| 5,630,208 A | 5/1997 | Enge et al. | |
| 5,918,161 A | 6/1999 | Kumar et al. | |
| 6,728,324 B1 | 4/2004 | Shan et al. | |
| 7,307,575 B2 | 12/2007 | Zemany | |
| 8,000,482 B2 | 8/2011 | Lambert et al. | |
| 8,169,362 B2 | 5/2012 | Cook et al. | |
| 8,330,642 B2 | 12/2012 | Jin et al. | |
| 2012/0007773 A1* | 1/2012 | Smith | G01S 7/292 342/195 |
| 2012/0235849 A1 | 9/2012 | Tatoian et al. | |
| 2012/0313810 A1 | 12/2012 | Nogueira-Nine | |

* cited by examiner

*Primary Examiner* — Timothy A Brainard
(74) *Attorney, Agent, or Firm* — Gene Vinokur; James McAleenan; Hironori Tsukamoto

(57) ABSTRACT

Targets are detected in a scene behind a wall by first transmitting a pulse through the wall. Then, a primary impulse response is detected by a sparse regularized least squares inversion applied to received signals corresponding to the reflected pulse. A delay operator that matches the primary impulse response to similar impulse responses in the received signals is also determined. A distortion of the pulse after the pulse passes through the wall but before the pulse is reflected by the target can also be determined. The distortion is used in an iterative process to refine the detection of the target and to suppress ghosting artifacts.

11 Claims, 3 Drawing Sheets

Multipath Elimination by Sparse Inversion

1: Input $r$, $s$, imaging operator $W$, subsampling operator $R$, $\bar{f}$ the adjoint of $f$, `maxiter`, `updateS`
2: Output $g_p$, $d$
3: Initialize $d = 0$, $g_p = 0$, $g_m = 0$
4: for $k = 1$ to `maxiter` do
5:   Solve for the update $g_k$
6:     $r_g = r - s * R(g_p + g_m)$
7:     $g_k = \underset{\tilde{g}}{\arg\min} \quad \|r_g - s * R\tilde{g}\|_2$
    subject to $\quad \|W\tilde{g}(n)\|_0 = 1, \forall n \in \{1, \ldots n_r\}$
8:   $g_p = g_p + g_k$
9:   Solve for the delay operator $d_k$
10:     $r_d = r - s * R(g_p + g_m)$
11:     $\tau_k = \|r_d\|_2^2 / \|\bar{f}(R, g_k, r_d, s)\|_\infty$
12:     $d_k = \underset{\tilde{d}}{\arg\min} \quad \|r_d - f(R, g_k, \tilde{d}, s)\|_2$
    subject to $\quad \|\tilde{d}\|_1 \leq \tau_k$
13:   $g_m = g_m + d_k * g_k$
14:   if `updateS == True` then
15:     Update the source waveform $s$
16:     $r_s = r - s * R(g_p + g_m)$
17:     $s_k = \underset{\tilde{s}}{\arg\min} \|r_s - \sum_{j=1}^{k} f(R, g_j, d_j, \tilde{s})\|_2$
18:     $s = s + s_k$
19:   end if
20: end for

Fig. 3

METHOD AND SYSTEM FOR THROUGH-THE-WALL IMAGING USING SPARSE INVERSION FOR BLIND MULTI-PATH ELIMINATION

FIELD OF THE INVENTION

This invention relates generally to through-the-wall imaging, and more particularly to using sparse inversion for multi-path elimination.

BACKGROUND OF THE INVENTION

Through-the-wall-imaging (TWI) can be used to detect objects inside enclosed structures. In TWI, a transmitter emits an electromagnetic (EM) radar pulse, which propagates through a wall. The pulse is reflected by a target on the other side of the wall, and then propagates back to a receiver as an impulse response convolved with the emitted pulse. Typically, the transmitter and receiver use an antenna array.

Depending on a dielectric permittivity and permeability of the wall, the received signal is often corrupted with indirect, secondary reflections from the wall, which result in ghost artifacts in an image that appear as noise. Wall clutter mitigation techniques attempt to eliminate the artifacts that arise from the multi-path reflections in TWI.

Some methods derive multi-path signal models to associate and map the multi-path ghosts to target locations. In a physics based approach to multi-path exploitation, an imaging kernel of a back-projection method is designed to focus specific propagation paths of interest. Target sparsity in TWI systems has also been used for multi-path elimination, specifically in compressive sensing synthetic aperture radar (SAR). That approach incorporates sources of multi-path reflections of interest into a sparsifying dictionary and solves a group sparse recovery problem to locate the targets from randomly subsampled, frequency stepped SAR data.

However, all of the above techniques assume perfect knowledge of a reflective geometry of the scene, which is not necessarily feasible in practice.

U.S. 20120235849 describes a through-the-wall radar imaging system where an impulse synthetic aperture radar system transmits short, ultra-wideband (UWB) carrierless microwave pulses at an obstacle behind which a target of interest is located. The return signals are received, stored and analyzed. Portions of the return signals that represent reflections from the obstacle are identified and analyzed in the time domain to estimate the transmission coefficient of the wall, either by estimating wall parameters or by using a shift and add procedure. The estimated transmission coefficient is used to filter the received signals to reduce the components of the received signal that are generated by the obstacle, and to compensate for distortion caused by the obstacle in the portions of the transmitted signal that are reflected by the target and returned, through the obstacle, to the radar system.

U.S. 20120313810 describes a through-the wall radar apparatus that transmits a frequency modulated transmit signal having a transmit bandwidth and a receiver antenna that receives a receive signal reflected from the scene. The receive signal is mixed with the transmit signal to obtain a mixed signal. A sampling unit samples the mixed signal to obtain samples. A measurement matrix determines the positions of one or more targets of the scene by applying compressive sensing.

SUMMARY OF THE INVENTION

The embodiments of the invention provide a method for multi-path elimination by sparse inversion (MESI). The method removes internal wall reflections (impulse responses) in a through-the-wall-imaging (TWI) system without prior knowledge of a geometry of a scene.

The method iteratively recovers time-domain primary impulse responses of targets behind a wall and then determines a delay convolution operator that best maps the primary impulse response of each target to the multi-path reflections available in the received signal. Because the number of targets and the number of reflecting surfaces is typically much smaller than the downrange extent of the scene, the embodiments use $l_1$ regularized sparse recovery for target detection and reflection-operator estimation.

In addition, the MESI is extended to enable the detection of targets directly in the image domain, even from randomly subsampled arrays, and to compensate for the distortion of the transmitted waveform due to the wall propagation.

The embodiments can use MESI for locating a target in the scene behind the wall without knowing scene or wall parameters, even when the received signals are subject to severe noise.

Specifically, targets are detected in a scene behind a wall by first transmitting an ultra-wide band (UWB) pulse through the wall. Then, a primary impulse response is detected by a sparse regularized least squares inversion applied to received signals corresponding to the reflected pulse.

A delay operator that matches the primary impulse response to similar impulse responses in the received signals is also determined. The primary impulse response and delay operator are sufficient to localize a target.

A distortion of the pulse after the pulse passes through the wall but before the pulse is reflected by the target can also be determined. The distortion is used in an iterative process to refine the detection of the targets and to suppress ghosting artifacts.

BRIEF DESCRIPTION OF THE DRAWINGS

FIG. 3 is a block diagram of the method of FIG. 2.

DETAILED DESCRIPTION OF THE PREFERRED EMBODIMENTS

System Setup

Figure 1:
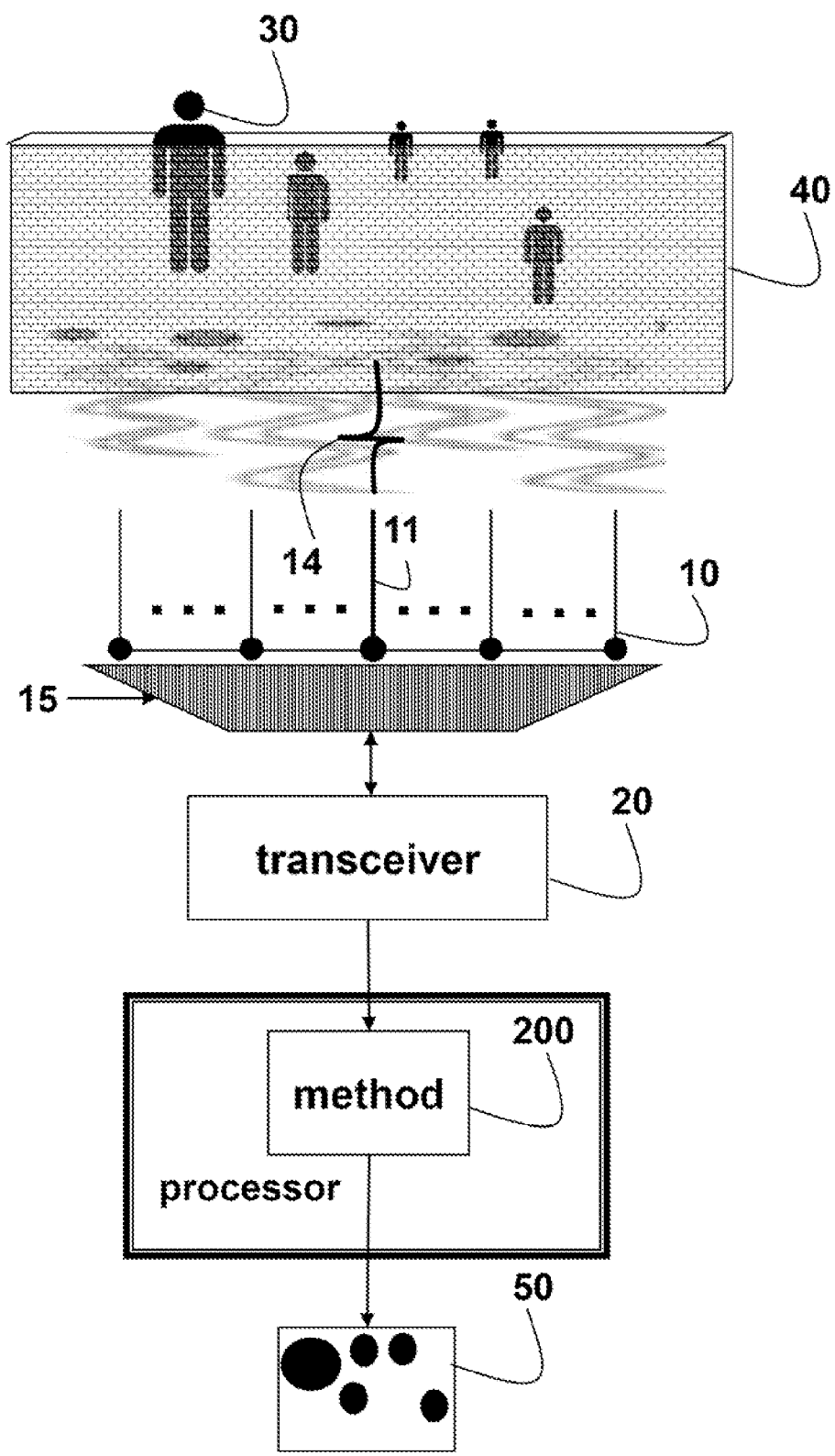
FIG. 1 is a schematic of a system for detecting targets behind a wall.
Figure 2:
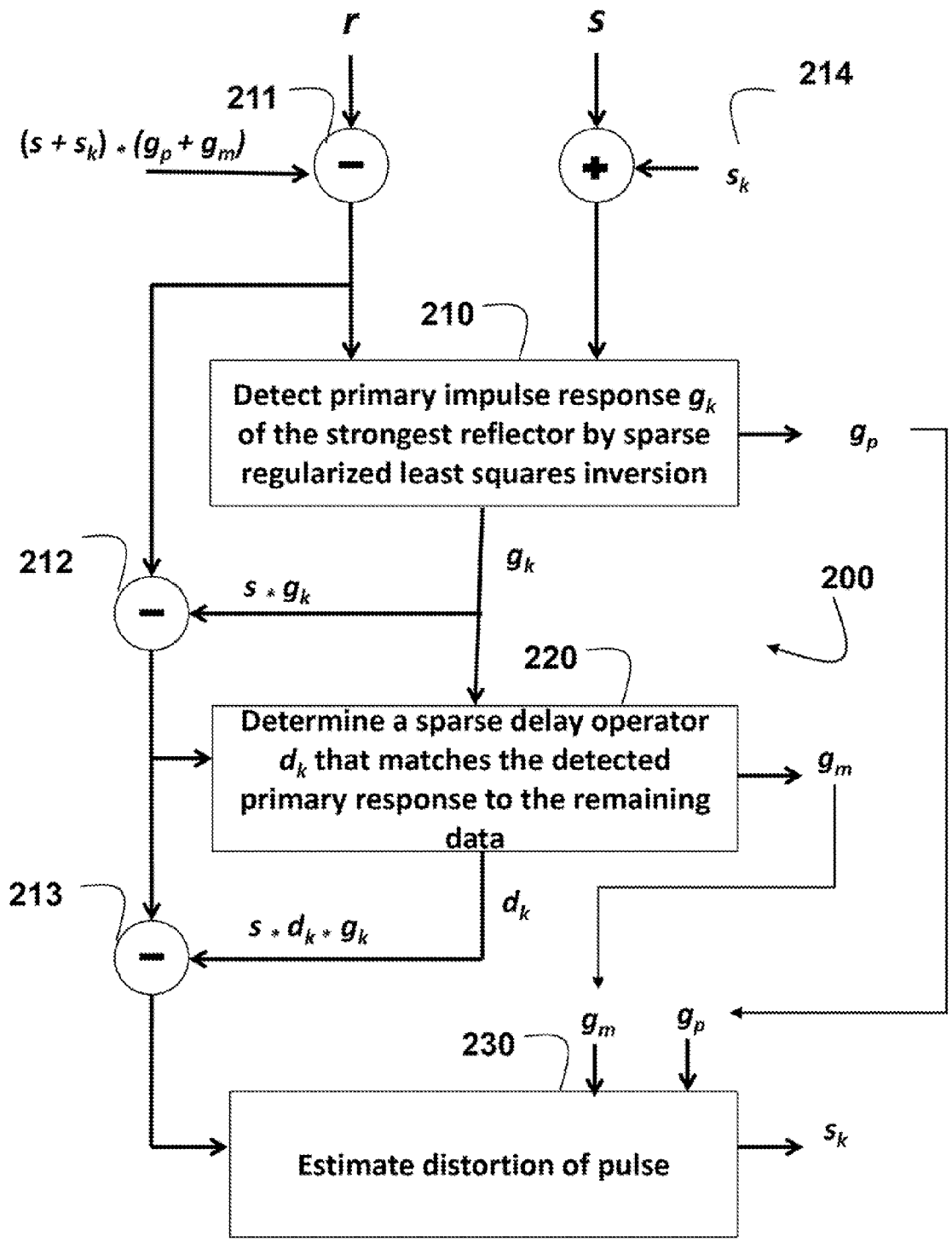
FIG. 2 is a flow diagram of a method for detecting the targets.

As shown in FIGS. 1 and 2, the embodiments of my invention provide a method 200 for multi-path removal in physical aperture and synthetic aperture radar (SAR) through-the-wall imaging (TWI) of targets 30 that does not require any prior knowledge of scene geometry. As an advantage, the method reduces ghosting artifacts by iteratively refining detected impulse responses.

A transceiver 20 transmits one or more pulses 14 by, e.g., selecting 15 a central antenna element 11 of an antenna array 10 with, for example, 21 elements. The receiving elements are half-wavelength apart:, which is 3 cm for a pulse with a central frequency $f_c$=5 GHz. Typically, through-the-wall radar and imaging systems operate in the ultra-wide band (UWB) from about 1.6 to about 10.5 GHz. 5. if the antenna array has a non-uniform separation distance between the elements, then, the time-domain data can be interpolated. In this case, the resolution of the output matches a smallest separation between the antenna elements.

The distance between array and the wall is about 4.5cm. The wall has two layers. The thickness and relative permittivity are 3 cm and $\epsilon_r=10$ for the outer layer and 1.2 cm and $\epsilon_r=5$ for the inner layer, respectively. With the wall, the channel is noisy at about 5.4 dB, and the receiver array is randomly subsampled with as many as 80% of the receiving antenna elements random selected 15 to be switched OFF.

The transmitted pulse propagates through the wall 40 and is Reflected by the possible targets 30 behind the wall 40. Reflected signals (impulse responses) 12, corresponding to each pulse, are received by elements of the entire array 10 as described below. The received signals include primal y impulse responses received via direct paths, and secondary impulse responses received by multi-paths. The method models received signals 12 at the antenna array as a sum of a primary response corresponding to direct paths from the targets, and multiple responses due the indirect multi-path reflections. The signals are processed by a method 200 to produce an image 50 that visualizes the targets. The method can be performed in a processor 201 connected to a memory and input/output interfaces as known in the art.

The method relies in part on an assumption that the scene behind the wall is sparse in the image domain, which translates to a sparse time-domain representation of the primary impulse response.

The method uses a modified multi-path elimination by sparse inversion (MESI) technique. The MESI first detects 210 a primary impulse response of the targets behind the wall and attributes the primary impulse response to a primary target. Herein, the term primary is used to indicate the direct path impulse response with the strongest (largest amplitude) component.

Then, a delay operator, which matches the primary impulse response to similar multipath reflections (secondary impulse responses) in the received signals, is determined 220. Note, during subsequent iterations, the primary impulse is first subtracted from the received signal to produce a residual signal for the matching.

Third, if the method iterates, a distortion of the source pulse is estimated 230. This estimate compensates for any distortions that may arise from signal propagation through the wall before the pulse is reflected. These three steps can be repeated until a termination condition is reached.

The modified MESI method can perform target detection directly in the image domain by using an imaging operator in the first primary detection step 210. Because the image domain is incoherent with the time domain, my MESI method can then recover targets and suppress artifacts using compressive radar arrays where a random subset of the receiving elements are active.

MESI Method

FIG. 2 shows the method for TWI according to embodiments of the invention. The basic operative steps of the method are described first. Then, the steps are modified to make the method iterative to produce a better result. The variables used by the method are describe in greater detail below. The figure also shows the inputs and outputs at each step.

The method uses the received signals r 12 that are a reflection of a source signal s. The sauce signal can be transmitted as a pulse by a single antenna element 11 through the wall at the targets behind the wall. The reflected signals are received by the antenna array with individual elements that can be switched ON or OFF. It is assumed that the method has access to both the transmitted source signal and the received signals.

A primary impulse response $g_k$ of a strongest reflected pulse is detected 210 by a sparse regularized least squares inversion.

Then, a sparse delay operator $d_k$ that matches the primary impulse response to a remaining signal is determined 220. The manning of the residual or remaining signal is described below for the iterative portion of the method.

Last, a distorted pulse $s_k$ is estimated 230. This is the distortion that affects the transmitted pulse after passing through the wall but before being reflected by the targets.

For the iterative method that improves the result, the primary and multiple responses of the detected target are subtracted 211 from the received signal, as $r=r-(s+s_k)*(g_p+g_m)$, to determine the remaining signal at this point in each iteration.

The remaining signal is redetermined after the detecting step 210 by subtracting 212 $s*g_k$.

The remaining signal is again redetermined after the step 220 by subtracting 213 $s*d_k*g_k$.

The pulse estimate $s_k$ is also added 214 to s before the next iteration.

Signal Model

I consider a monostatic physical aperture radar with the single transmit (source) element 11 located at the center of the one-dimensional array 10 of $n_r$ receiving antenna elements. The array is placed approximately parallel to the external front of the wall, with respect to the scene.

Let s(t) be the time-domain waveform of the pulse that is transmitted by the source, and denote by $g_p(t, n)$ the primary impulse response of the scene at each receiver $n \in \{1, \ldots, n_r\}$ with walls but excluding multi-path reflections (impulse responses), which is essentially a delayed version of impulse response when there are no walls. Also denote by $g_m(t, n)$ the impulse response of the multi-path reflections due to the wall clutter as well as other reflecting surfaces in the scene. Using a time-domain representation of the received signal model, the received signal r(t, n) is $$r(t, n) = s(t)*(g_p(t, n) + g_m(t, n)), \quad (1)$$

where * is a convolution operator.

Without loss of generality, suppose that there are K target objects in the scene, each inducing a primary impulse response $g_k(t, n)$, where the index $k \in \{1 \ldots K\}$. The multiple impulse responses can then be modeled by the convolution of a delay operator $d_k(t)$ with the primary impulse response $g_k(t, n)$ of each target in the scene, such that, $$g_P(t, n) = \sum_{K=1}^{K} g_k(t, n), \quad (2)$$

$$g_m(t, n) = \sum_{k=1}^{K} d_k(t)*g_k(t, n).$$

Here, the delay operator is a sequence of weighted Dirac delta functions $$d_k(t) = \sum_{i \in \Lambda_k} w(t_i)\delta(t - t_i),$$

where $t_i$ is the additional time taken by the multiple responses to reach the receiver from the $i^{th}$ multi-path source, $w(t_i)$ is an attenuation weight of the $i^{th}$ path, and $\Lambda_k$ is the set of all sources of multi-path reflections contributing to the multiple repetitions of target k. Consequently, the received signal model can be written as a superposition of the primary and multiple responses of all K targets in the scene as $$r(t, n) = s(t) * \left( g_p(t, n) + \sum_{k=1}^{K} d_k(t) * g_k(t, n) \right) \quad (3)$$

$$= \sum_{k=1}^{K} s(t) * (g_k(t, n) + d_k(t) * g_k(t, n)),$$

In a blind multi-path elimination scenario, there is no information about the geometry of the scene, the sources and/or paths of the multiple reflections, or the number of targets in the scene. Our objective is to determine the impulse responses $g_k(t, n)$ of all K targets using only the received signals r(t, n) and an estimate of the waveform s(t) of the source pulse.

The problem in Eqn. (3) non-convex and generally ill-posed. However, the following reasonable assumptions make the problem well-behaved.

(A) The primary reflected impulse response with a most direct path between the receiver and the targets has a strongest response compared to other multi-path reflections.

(B) The primary reflectors (targets) in the scene to be imaged and the number of reflecting surfaces that induce the multi-path are sparse. As used herein, sparsity is not a relative term, but rather a term of art in the field of numerical analysis. Sparse data or signals are primarily populated with zero coefficients. That is the number of zero elements is much much greater than the number of non-zero coefficients.

Multipath Elimination by Sparse Inversion (MESI)

The multi-path elimination problem is formulated as a determination of the primary impulse responses $g_k$ and the delay operators $d_k$ given the received signal r and the source pulse s. A forward model $f(.)$ is $$f(g_k, d_k, s) := s * (g_k + d_k * g_k), \quad (4)$$

and solve the sparse regularized a least squares inversion problem $$\min_{\substack{g_k, d_k \\ \forall k}} \left\| r - \sum_{k=1}^{K} f(g_k, d_k, s) \right\|_2. \quad (5)$$

However, the function $f(.)$ is non-convex in $g_k$ and $d_k$, and the inverse problem is ill-posed in general. To make the problem well-posed, I use sparsity constraints on $g_k$ and $d_k$, and deal with the non-convexity of $f$ in the variable space by following a block coordinate-descent minimization, which renders the problem convex in each of the variables $g_k$ and $d_k$, separately. This technique is called multi-path elimination by sparse inversion (MESI). FIG. 3 shows the pseudocode 300 that implements this method. The variable used in the pseudo cod are self explanatory and described herein.

Inputs to the method include the signals s and r, the imaging operator W, the sampling operator R, the forward model $f$, and its adjoint $\tilde{f}$, the maximum number of iterations (max-iter), and a source update flag (updateS). The output is the impulse responses $g_k$ and the delay operators $d_k$.

The method can be summarized as follows. The method detects locations of targets behind a wall using a radar transmitter and antenna array. The method:

a) receives signals by each component of the antenna array comprising a superposition of a primary response of the targets, as well as secondary responses due to multipath reflections and additive noise;

b) detects the primary impulse response of a strongest reflector either in the time-domain received data or in processed image-domain data;

c) determines a convolution operator that matches the primary impulse response to any multiple reflections present in the received time-domain data and identifies the corresponding delay and attenuation coefficients of the response;

d) estimates the pulse with any distortions arising from propagation of the pulse through the wall in to improve the detection of the remaining primary responses;

e) subtracts the primary and multiple responses convolved with the estimated pulse from the received signal;

f) repeating steps b) through e) until a termination condition is reached, e.g., convergence or until a data mismatch threshold is reached;

g) outputting a time-domain signal corresponding the multiple and noise-free input signal; and h) outputting, an image-domain signal identifying the locations of the targets inside behind the wall without the appearance of ghost targets.

The Basic MESI Method

The MESI method has two minimization stages. The first minimizing stage constitutes a sparse matched filtering step (6) in which the impulse response $g_k$ of the strongest reflector in the residual signal $r_g$ of all receivers is detected using the sparse regularized least squares inversion. The residual signal is $r_g = r - s * (g_p + g_m)$, where $g_p$ and $g_m$ are the estimated primary and multiple impulse responses, both initialized to zero for the first iteration.

Following from assumption (A) above, I consider $g_k$ to be the primary impulse response of a target in the scene. The primary impulse response update $g_k$ identifies a single spike for each receiver that best approximates the residual signal $r_g$ by solving the sparse recovery problem $$g_k = \underset{\tilde{g}}{\operatorname{argmin}} \| r_g - s * \tilde{g} \|_2 \quad (6)$$

subjectto $$\|\tilde{g}(n)\|_0 = 1,$$

$$\forall n \in \{1, \ldots, n_r\}.$$

The primary impulse response is then updated such hat $g_p = g_p + g_k$.

In the second stage, I determine the delay operator $d_k$ that matches the detected impulse response $g_k$ with the remaining reflections in the residual signal $r_d = r - s * (g_p + g_m)$. Here, all antenna elements are assumed to receive multiple reflections of the primary target $g_k$ with the same delay operator $d_k$. Moreover, assumption (B) indicates that the operator $d_k$ should be sparse, which leads to the following least absolute shrinkage and selection operator (LASSO) problem $$d_k = \underset{\tilde{d}}{\operatorname{argmin}} \| r_d - f(g_k, \tilde{d}, s) \|_2 \quad (7)$$

subjectto $$\|\tilde{d}\|_1 \leq \tau_k$$

where $$\tau_k = \frac{\|r_d\|_2^2}{\|\tilde{f}(g_k, r_d, s)\|_\infty},$$

and $\tilde{f}$ denotes the adjoint of $f$.

The choice of $\tau_k$ ensures that the delay operator $d_k$ contains only a small number of nonzero entries. Therefore, the nonzero components in the delay $d_k$ have to match $g_k$ with the strongest coherent multi-path reflections in $r_g$, while ignoring incoherent responses and artifacts. The multiple impulse response $g_m$ is then updated according to $g_m = g_m + d_k * g_k$. The above two stages are repeated until the maximum number of iterations is reached, or a preset data mismatch is reached.

Extensions

The structure of the MESI method allows for extensions that address multi-path elimination under a variety of conditions.

For example, one can exploit the sparsity in the image domain, instead of the time domain by introducing an imaging operator into the regularization term in Eqn. (6). Let W be any linear operator that maps the time domain received signal to the down-range/cross-range, image pixel domain, i.e.

$$W: C^{n_t \times n_r} \to C^{N_x \times N_y},$$

where $n_t$ is the number of time samples, $N_x$ is the resolution in the cross-range and $N_y$ is the resolution in the downrange.

Moreover, because the image domain is incoherent with the time domain, performing the recovery in the image domain allows for the use of MESI in the compressed sensing regime, where the receiving antennas are randomly subsampled using a sampling operator R that selects a subset in of the $n_r$ receivers, i.e., $$R: \{1, \ldots n_r\} \to \Omega \subseteq \{1, \ldots n_r\}, |\Omega|=m \leq n_r.$$

The generalized, sparse recovery problem becomes $$g_k = \underset{\tilde{g}}{\operatorname{argmin}} \|r_g - s * R\tilde{g}\|_2 \quad (8)$$

subject to $$\|W\tilde{g}(n)\|_0 = 1,$$

$$\forall n \in \{1, \ldots, n_r\},$$

and the forward model $f(.)$ is rewritten as $$f(R, g_k, d_k, s) := s * R(g_k + d_k * g_k). \quad (9)$$

The source waveform $s(t)$ can undergo distortions due to the propagation of the signals through dielectric walls. As a result, the received signal at the antenna array is composed of the convolution of the primary and multiple impulse responses with a modified waveform $\tilde{s}(t)$. Depending on the severity of the waveform distortion, the impulse response estimation by matched-filtering stage can include artifacts.

I compensate for waveform distortions by a third source waveform estimation stage in the MESI method. In this stage, I determine the least squares update $s_k$ for the source waveform by determining a least squares fit between the forward model and the residual signal as follows $$s_k = \arg\min_{\tilde{s}} \left\| r_s - \sum_{j=1}^{k} f(g_j, d_j, \tilde{s}) \right\|_2. \quad (10)$$

In essence, this step estimates a distortion of the pulse after the pulse passes through the wall but before the pulse is reflected by the targets.

Then, the updated source waveform $s = s + s_k$ 214 is used in the subsequent iterations of the MESI method.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A system for detecting a target in a scene behind a wall, comprising:
    an antenna array arranged approximately parallel to a front of the wall;
    a transmitter configured to transmit a pulse through the wall;
    a receiver configured to receive received signals reflected by the target through the wall in response to transmitting the pulse;
    means for detecting a primary impulse response by a sparse regularized least squares inversion based on the pulse and the received signals; and
    means for determining a delay operator that matches the primary impulse response to similar impulse responses in the received signals.

2. The system of claim 1, wherein a distortion of the pulse is estimated after the pulse passes through the wall but before the pulse is reflected by the target.

3. The system of claim 1, wherein the pulse is an ultrawide band signal, and the received signals are received by a linear array of antenna elements, wherein one or more elements of the array are used to transmit the pulse.

4. The system of claim 3, wherein the antenna elements are subsampled randomly with as many as 80% of the antenna array elements randomly switched OFF.

5. The system of claim 1, wherein the received signals include the primary impulse response received via a direct path, and secondary impulse responses received by multi-paths.

6. The system of claim 1, wherein the scene behind the wall is sparse in an image domain, and the primary response is sparse in a time domain, and wherein the image domain is incoherent with the time domain.

7. The system of claim 1, wherein the target is imaged using the primary pulse and the delay.

8. The system of claim 1, wherein the delay operator is a sequence of weighted Dirac delta functions.

9. The system of claim 1, wherein clutter induced by internal wall reflections is removed without knowledge of physical properties or geometric characteristics of the scene and wall.

10. The system of claim 1, wherein the primary impulse response is detected in an image domain and the delay operator is determined in a time domain.

11. The system of claim 1, wherein the delay operator identifies multipath reflections corresponding to secondary impulse responses.

* * * * *